US011255993B2

(12) United States Patent
Brytik et al.

(10) Patent No.: US 11,255,993 B2
(45) Date of Patent: Feb. 22, 2022

(54) VARIABLE APERTURE ESTIMATION USING BOTTOM-UP RAY TRACING

(71) Applicants: Valeriy V. Brytik, Houston, TX (US); Yaxun Tang, Spring, TX (US); David Gaines, Houston, TX (US); Fuxian Song, Spring, TX (US); Anton Spirkin, Broomfield, CO (US)

(72) Inventors: Valeriy V. Brytik, Houston, TX (US); Yaxun Tang, Spring, TX (US); David Gaines, Houston, TX (US); Fuxian Song, Spring, TX (US); Anton Spirkin, Broomfield, CO (US)

(73) Assignee: ExxonMobil Upstream Research Company, Spring, TX (US)

( * ) Notice: Subject to any disclaimer, the term of this patent is extended or adjusted under 35 U.S.C. 154(b) by 760 days.

(21) Appl. No.: 16/189,711

(22) Filed: Nov. 13, 2018

(65) Prior Publication Data

US 2019/0204463 A1    Jul. 4, 2019

Related U.S. Application Data

(60) Provisional application No. 62/611,068, filed on Dec. 28, 2017.

(51) Int. Cl.
*G01V 1/28* (2006.01)
*G01V 1/30* (2006.01)
(Continued)

(52) U.S. Cl.
CPC .............. *G01V 1/282* (2013.01); *G01V 1/303* (2013.01); *G01V 1/306* (2013.01); *G01V 1/345* (2013.01);
(Continued)

(58) Field of Classification Search
CPC ........ G01V 1/345; G01V 1/306; G01V 1/282; G01V 1/303; G01V 1/368; G01V 2210/671
See application file for complete search history.

(56) References Cited

U.S. PATENT DOCUMENTS 10,386,511 B2 *  8/2019  Routh .................... G01V 1/003
10,620,341 B2 *  4/2020  Johnson ............... G01V 99/005

OTHER PUBLICATIONS

He, R. et al/ (2016)"The Application of Reverse-Time migration in the Z Area of PRM Basin," *International Journal of Geosciences*, 2016, v. 7, pp. 785-791.

(Continued)

*Primary Examiner* — Elias Desta
(74) *Attorney, Agent, or Firm* — ExxonMobil Upstream Research Company—Law Department (57) ABSTRACT

A method and apparatus for imaging seismic data includes obtaining an initial model of a subsurface formation, wherein the model includes a plurality of nodes that form at least part of a grid; an initial dip value for the nodes; and a set of origin coordinates for each of the nodes; performing bottom-up ray tracing for each node in the model, resulting in a set of arrival coordinates for each node; identifying a plurality of gathers from the seismic data; for each gather: calculating a set of midpoint coordinates; defining a midpoint vicinity surrounding the set of midpoint coordinates; identifying the nodes having arrival coordinates within the midpoint vicinity; and estimating a unique aperture for each of the gathers based on the respective origin coordinates; storing the estimated apertures in a table; and generating a subsurface volume or image with subsurface reflectors determined with apertures of the respective gathers.

15 Claims, 7 Drawing Sheets

(51) Int. Cl.
   *G01V 1/36* (2006.01)
   *G01V 1/34* (2006.01)
(52) U.S. Cl.
   CPC ........ *G01V 1/368* (2013.01); *G01V 2210/671* (2013.01)

(56) References Cited

OTHER PUBLICATIONS

Jin, S. et al. (2010) "Visibility Analysis for Target-Oriented Reverse Time Migration and Optimizing Acquisition Parameters, " *Leading Edge*, Nov. 2010, pp. 1372-1377,.

Sun, H. et al. (2002) "Kirchhoff Migration with an Optimized Imaging Aperture," Los Alamos National Laboratory, *SEG* 72, Oct. 6-11, 2002, pp. 1125-1128.

* cited by examiner

| Iter | Comp_Grad | Comp_LS |
|---|---|---|
| 0 | 8776.00 | 903.00 |
| 1 | 9044.00 | 797.00 |
| 2 | 8928.00 | 784.00 |
| 3 | 7902.00 | 781.00 |
| 4 | 8931.00 | 790.00 |
| 5 | 7961.00 | 814.00 |

FIG. 5A

| Iter | Comp_Grad | Comp_LS |
|---|---|---|
| 0 | 6147.00 | 609.00 |
| 1 | 5621.00 | 625.00 |
| 2 | 5615.00 | 587.00 |
| 3 | 5576.00 | 586.00 |
| 4 | 5539.00 | 631.00 |
| 5 | 5615.00 | 0.00 |

VARIABLE APERTURE ESTIMATION USING BOTTOM-UP RAY TRACING

CROSS REFERENCE TO RELATED APPLICATIONS

This application claims the priority benefit of U.S. Patent Application No. 62/611,068 filed Dec. 28, 2017 entitled VARIABLE APERTURE ESTIMATION USING BOTTOM-UP RAY TRACING, the entirety of which is incorporated by reference herein.

FIELD

This disclosure relates generally to the field of geophysical prospecting and, more particularly, to seismic prospecting for hydrocarbons and related data processing. Specifically, exemplary embodiments relate to methods for improving computational efficiency by using variable aperture estimation for Full Wavefield Inversion.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of seismic prospecting is to accurately image subsurface structures commonly referred to as reflectors. Seismic prospecting is facilitated by acquiring raw seismic data during performance of a seismic survey. During a seismic survey, a seismic source generates seismic energy (e.g., a controlled explosion, or "shot") which is delivered into the earth. Seismic waves are reflected from subsurface structures and are received by a number of seismic receivers (e.g., geophones). The seismic data received by the seismic receivers is processed in an effort to create an accurate mapping of the subsurface environment. The processed data is then examined (e.g., analysis of images from the mapping) with a goal of identifying geological formations that may contain hydrocarbons.

Full Wavefield Inversion ("FWI") is a geophysical data processing method which is used to estimate subsurface properties (such as velocity or density). Typical FWI workflow design assumes similar or identical aperture estimations for all gathers (e.g., common shot gathers) in the survey. Typically, aperture width is estimated based on the steepest dips (angle between a planar subsurface feature and a horizontal plane) observed in the initial model. An aperture estimation that is appropriate only for a small portion of high-dip gathers may be too exaggerated for the rest of the data, leading to inadequate utilization of computational resources and introduction of artificial noise into the inverted data. For example, swing noise may be introduced as a result of migrated data that does not add coherently. In the end, imaging and analysis of subsurface properties may suffer, impeding identification of the hydrocarbon potential of a formation, and ultimately the hydrocarbon management thereof.

Attempts have been made to more efficiently select apertures. Many attempts fall into two categories: one focuses "experimental" choice of an aperture, and the second targets oriented choice of an aperture. For example, in "*Visibility Analysis for Target-Oriented Reverse Time Migration and Optimizing Acquisition Parameters*," Shengwen Jin and Shiyong Xu, Halliburton Landmark Software and Services, *Leading Edge*, November 2010, the authors discuss optimal choice of the source-receiver couples contributing to the significant part of the target image. This method does not select apertures for all gathers of the survey. As another example, in "*The Application of Reverse-Time migration in the Z Area of PRM Basin*," Run He, Yuan Fang, Yanchun Wang, Lifang Cheng, Xi Zheng, *International Journal of Geosciences*, 2016, 7, 785-791, the authors discuss performing an experiment to choose a constant aperture prior to perform modeling or migration using prestack Kirchhoff migration. This method selects a constant aperture for all shot gathers of the survey. As another example, in "*Kirchhoff Migration with an Optimized Imaging Aperture*," Hongchuan Sun, Lianjjie Huang, Michael C. Fehler, Los Alamos National Laboratory, *SEG* 72, Oct. 6-11, 2002, the authors discuss choice of aperture by migrating a trace to a narrow region filled with specular reflection points. This method specifically attempts to avoid dynamic ray tracing. None of the existing techniques are believed to choose aperture reliably, computationally efficiently, and applicable to all gathers of an entire survey.

More efficient equipment and techniques to match aperture estimations to survey data would be beneficial.

SUMMARY

A method of imaging seismic data for a subsurface formation includes obtaining an initial model of the subsurface formation, wherein the initial model includes a plurality of nodes that form at least part of a grid; an initial dip value for the plurality of nodes; and a set of origin coordinates for each of the plurality of nodes; performing bottom-up ray tracing for each node in the initial model, resulting in a set of arrival coordinates for each node; identifying a plurality of gathers from the seismic data; for each gather from the seismic data: calculating a set of midpoint coordinates; defining a midpoint vicinity surrounding the set of midpoint coordinates; identifying the nodes having arrival coordinates within the midpoint vicinity; and estimating a unique aperture for each of the plurality of gathers based on the respective origin coordinates; storing the estimated aperture for each gather in a table; and generating a subsurface volume or image with subsurface reflectors determined with apertures of the respective gathers.

A non-transitory computer readable medium having executable instructions that when executed cause a processor to obtain an initial model of a subsurface formation, wherein the initial model includes a plurality of nodes that form at least part of a grid; an initial dip value for the plurality of nodes; and a set of origin coordinates for each of the plurality of nodes; perform bottom-up ray tracing for each node in the initial model, resulting in a set of arrival coordinates for each node; identify a plurality of gathers from a seismic data set; for each gather from the seismic data set: calculate a set of midpoint coordinates; define a midpoint vicinity surrounding the set of midpoint coordinates; identify the nodes having arrival coordinates within the midpoint vicinity; and, estimate a unique aperture for each of the plurality of gathers based on the respective origin coordinates; store the estimated aperture for each gather in a table; and generate a subsurface volume or image with subsurface reflectors determined with apertures of the respective gathers.

A seismic data analysis system including a processor; and a display configured to display graphical representations of a seismic data set, wherein the seismic data analysis system is configured to obtain an initial model of a subsurface formation, wherein the initial model comprises: a plurality of nodes that form at least part of a grid; an initial dip value for the plurality of nodes; and a set of origin coordinates for each node; perform bottom-up ray tracing for each node in the initial model, resulting in a set of arrival coordinates for each node; identify a plurality of gathers from the seismic data set; for each gather from the seismic data set: calculate a set of midpoint coordinates; define a midpoint vicinity surrounding the set of midpoint coordinates; identify the nodes having arrival coordinates within the midpoint vicinity; and estimate a unique aperture for each of the plurality of gathers based on the respective origin coordinates; store the estimated aperture for each gather in a table; and invert the seismic data set with the aperture table to produce a graphical representations of the seismic data set.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of unplanned phenomena. "Nominal" may be implied as commonly used in the fields of seismic prospecting and/or hydrocarbon management.

The terms "velocity model", "density model", or "physical property model" as used herein refer to an array of numbers, typically a 3-D array, where each number, which may be called a model parameter, is a value of velocity, density, or another physical property in a cell, where a subsurface region has been conceptually divided into discrete cells for computational purposes.

As used herein, "hydrocarbon management" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of, and/or abandoning hydrocarbon resources, reviewing prior hydrocarbon management decisions, and any other hydrocarbon-related acts or activities.

"Obtaining" data shall mean any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, "In-line" refers to a direction parallel to the axis between a source and a receiver. "Cross-line" refers to a direction perpendicular to the axis between a source and a receiver. "Offset" refers to a distance between a source and a receiver. "Midpoint" refers to a location on the axis between a source and a receiver that is approximately half-way between the source and the receiver.

Full Wavefield Inversion ("FWI") is a geophysical method which is used to estimate subsurface properties (such as velocity or density). It is known to be advanced for the higher resolution and more accurate physics compared to conventional methods. The fundamental components of an FWI algorithm can be described as follows: using a starting subsurface physical properties model, synthetic seismic data are generated by solving a wave equation using a numerical scheme (e.g., finite-difference, finite-element etc.). The synthetic seismic data are compared with the field seismic data, and, using the difference between the two, the value of an objective function is calculated. To minimize the objective function, a modified subsurface model is generated which is used to simulate a new set of synthetic seismic data. This new set of synthetic seismic data is compared with the field data to recalculate the value of the objective function. The objective function optimization procedure is iterated by using the new updated model as the starting model for finding another search direction, which will then be used to perturb the model in order to better explain the observed data. The process continues until an updated model is found that satisfactorily explains the observed data. A global or local optimization method can be used to minimize the objective function and to update the subsurface model. Commonly used local objective function optimization methods include, but are not limited to, gradient search, conjugate gradients, quasi-Newton, Gauss-Newton, and Newton's method. Commonly used global methods included, but are not limited to, Monte Carlo or grid search.

In complex geological environments, wave migration is recognized to be an important technique for imaging seismic data. Wave migration comes in two forms, usually called WEM and RTM. In WEM ("Wave Equation Migration"), energy is back-propagated from the seismic receivers using a one-way wave equation, and forward-propagated from the corresponding seismic source. The wavefields are cross-correlated at image points to create the subsurface image. WEM can produce good images for reflectors with relatively shallow dip angle. In RTM ("Reverse Time Migration"), the wavefield at the seismic receivers is back-propagated using a two-way wave equation, and cross-correlated with energy forward-propagated from the seismic source. RTM can produce good images at all reflector dips, but may be more expensive in terms of computational resources than WEM by a factor typically in the range of 4 to 10.

Although imaging tools such as wave migration and FWI are important parts of the seismic processing, especially in the complex geologic regions, they may be computationally expensive. For example, a forward-modeling engine (for modeling a full seismic wavefield) is both essential and computationally expensive. Likewise, image creation with RTM and local differentiation that leads to the gradient estimation may be valuable but computationally expensive.

In order for a seismic simulator to efficiently identify complex, three-dimensional subsurface structures, especially highly dipping interfaces, the modeling/imaging aperture should be appropriately selected. Aperture refers to the imaging bounds of the subsurface information. For a given source-receiver pair, the aperture is a cross-sectional area, projected into the subsurface formation, that determines which subsurface reflectors will be included in an image (and which will not). The dimensions of the aperture directly impact both quality of the obtained image and computational resources needed to run simulations. Typically, the aperture includes the source-receiver pair, the area therebetween (i.e., the "source-receiver offset", or simply "offset"), an area extending away from the source known as the "source padding," and an area extending away from the receiver known as the "receiver padding." The source padding may or may not equal the receiver padding. At times, the source padding and/or the receiver padding may be zero. In some embodiments, aperture depends on formation velocity and dip values. In some embodiments, the aperture may be of the same or similar dimensions in the cross-line direction as in the in-line directions. For example, dip values in the in-line direction may determine both the extent of the aperture in the in-line direction as well as the extent of the aperture in the cross-line direction. In some embodiments, formation velocity and dip values of subsurface features in the cross-line direction may determine the extent of the aperture in the cross-line direction. A smaller aperture may improve image quality for simple subsurface structures and improve computational efficiency. However, a smaller aperture may fail to provide adequate imaging for steep structures, such as high-dip reflectors. A larger aperture may improve imaging of steep structures, but it may dramatically degrade computational efficiency and boost unwanted noise. For example, if a constant aperture is chosen based on localized, highly-dipping events, the aperture may be unnecessarily large for other portions of the survey. Too large of an aperture may lead to significant waste of computational resources and may also boost undesirable swinging noise.

One of the many potential advantages of the embodiments of the present disclosure is that unique aperture values are utilized for various portions of the data/gathers of the surveyed formation. In other words, the whole survey is appropriately addressed. Another potential advantage includes using a combination of bottom-up ray tracing, subsurface dipping structure, and midpoint calculation to define aperture. Another potential advantage includes combining information into a comprehensive table of apertures for use in shot-based modeling and/or migration. Another potential advantage includes identifying a direct relation between 3D properties of the input volumes and the RTM/FWI simulation setup parameters. Another potential advantage includes improving efficiency and/or speed for RTM/FWI gradient computation. In some embodiments, computational performance improvements may be between 10% and 50%. For example, computational performance improvements in FWI simulations of at least 20% have been observed. Another potential advantage includes reducing levels of artificial (numerical) noise in FWI results. Embodiments of the present disclosure can thereby be useful in the discovery and/or extraction of hydrocarbons from subsurface formations, and hydrocarbon management thereof.

Typical FWI workflow design assumes similar or identical aperture estimations for all gathers in the survey. As used herein, "gather" refers to a display of seismic traces that share an acquisition parameter. For example, a common midpoint gather contains traces having a common midpoint, while a common shot gather contains traces having a common shot. Embodiments disclosed herein include a method to estimate aperture that is fitting for each common shot (or common receiver) gather that takes into account the 3D anisotropic properties of the subsurface. More specifically, bottom-up ray tracing may be utilized to identify part(s) of the subsurface that contain important information for the imaging of the selected gathers, and/or subsequently estimate aperture. In some embodiments, the proposed algorithm may optimize aperture estimations for the FWI gradient computations and at the same time retain most or all of the data important for the inversion.

In some embodiments, key features of a method include:
Trace rays emitted from a subset of the subsurface nodes, the rays being launched normal to the local reflector orientation, and recording both ray origin coordinates and final arrival coordinates at the top surface (e.g., computational domain top surface).
For each common shot (or common receiver) gather, calculate midpoint coordinates, and identify the subset of rays that arrived to the surface in a selected (e.g., user specified) vicinity of the midpoint.
Identify a subsurface volume that contains important information (e.g., will contribute to the imaging at the considered midpoint location) based on a collection of points that represents origins of the selected rays.
Estimate aperture values for some or all selected gathers (e.g., identified by midpoint coordinates), and generate cross-line and in-line aperture padding maps, for example, for quality control purposes.
In some embodiments, adjust results using a target-oriented approach (e.g., increase or decrease aperture padding for set(s) of shots that are responsible for imaging of a specific part(s) of the subsurface).

Variable aperture estimation techniques may beneficially improve imaging and/or modeling when existing subsurface formation models contain large dip variations. For example, significant computational performance improvements may be provided, such as two to three times speed improvement for the FWI gradient computation step. Variable aperture estimation techniques may also beneficially reduce numerical noise and/or improve continuity and consistency of the imaging and/or modeling of the reflectors.

Figure 1A:
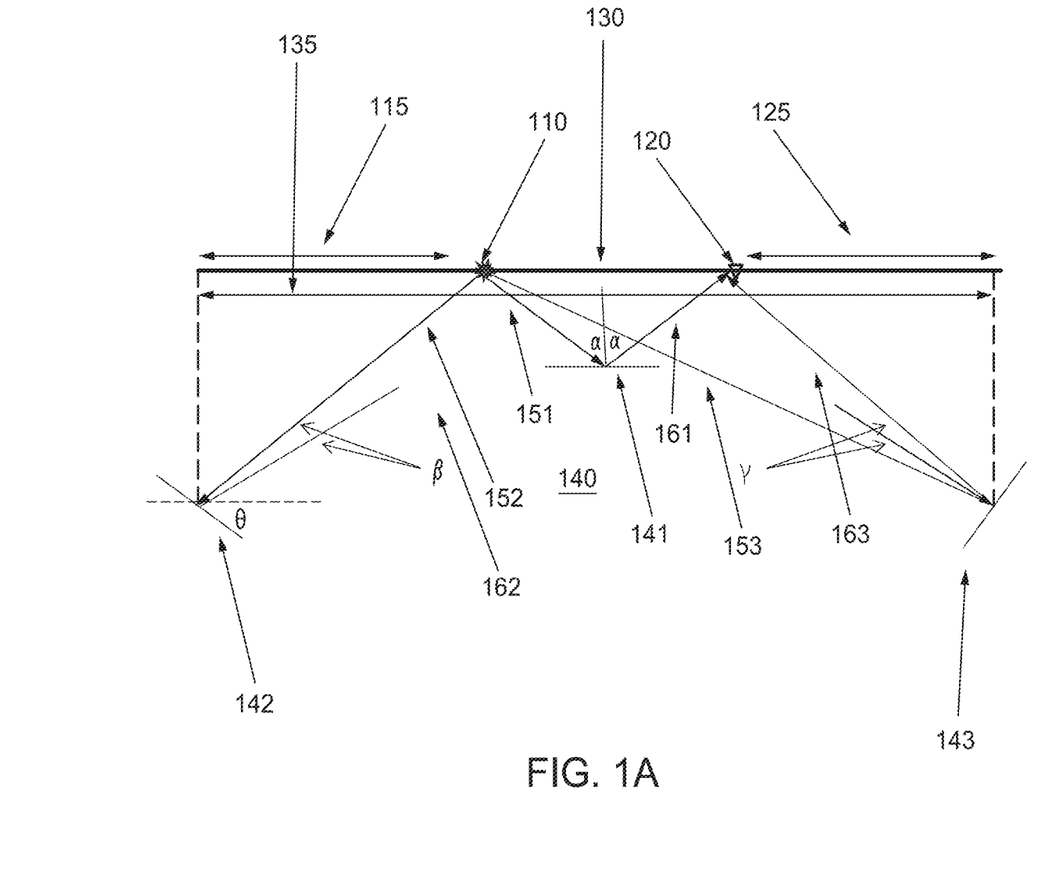
FIGS. 1A-1B each illustrate an exemplary portion of a seismic survey.

FIG. 1A illustrates an exemplary portion of a seismic survey. As would be understood by one of ordinary skill in the art with the benefit of this disclosure, the illustration of FIG. 1A may be equally applicable to, inter alia, portions of a seismic survey (e.g., acquired data), portions of a model of a seismic survey domain (e.g., modeled data), and/or portions of a seismic survey design (e.g., hypothetical data). Seismic source 110 and seismic receiver 120 are located at points on the surface 130 of a formation 140. As illustrated, formation 140 contains three reflectors: 141, 142, and 143. Each reflector has a different dip angle. For example, the dip angle of reflector 141 is 0° (parallel to surface 130), while the dip angle of reflector 142 is marked with θ. Three expected paths 151, 152, 153 of seismic waves emanating from seismic source 110 are shown. When the seismic waves encounter interfaces in the formation 140, such as reflectors 141, 142, 143, a portion of the seismic energy is reflected. Three expected paths 161, 162, 163 of reflected seismic waves are shown. In particular, the illustrated paths are those that emanate from seismic source 110, encounter and reflect from reflectors 141, 142, 143, and are detected by seismic receiver 120. As illustrated, path 151 encounters reflector 141 at an angle α to the normal of the reflector 141, and thus path 161 reflects towards seismic receiver 120 at an angle α to the normal of the reflector 141 (i.e., specular reflection). Likewise, path 152 encounters reflector 142, and path 162 reflects at an angle β to the normal of the reflector 142, and path 153 encounters reflector 143, and path 163 reflects at an angle γ to the normal of the reflector 143.

The aperture 135 of the source-receiver configuration shown in FIG. 1A extends from the distal (left) end of source padding 115 to the distal (right) end of receiver padding 125. Likewise, the source padding 115 extends from the seismic source 110 to the distal (left) extent of the aperture 135 on the source-side, while the receiver padding 125 extends from the seismic receiver 120 to the distal (right) extent of the aperture 135 on the receiver-side. The source padding 115 may or may not be equal to the receiver padding 125. The gather represented by FIG. 1A includes any and all rays that emanate from seismic source 110, encounter a reflector within the aperture 135 and reflect therefrom, and then are detected by seismic receiver 120. Note that the dip angle of reflector 142 influences the source padding 115, and the dip angle of reflector 143 influences the receiver padding 125. When the subsurface formation includes highly dipping reflectors, a larger aperture may better ensure correct forward simulation results. On the other hand, when the subsurface formation includes primarily flat or slightly dipping reflectors, a smaller aperture may be more computationally efficient.

Figure 1B:
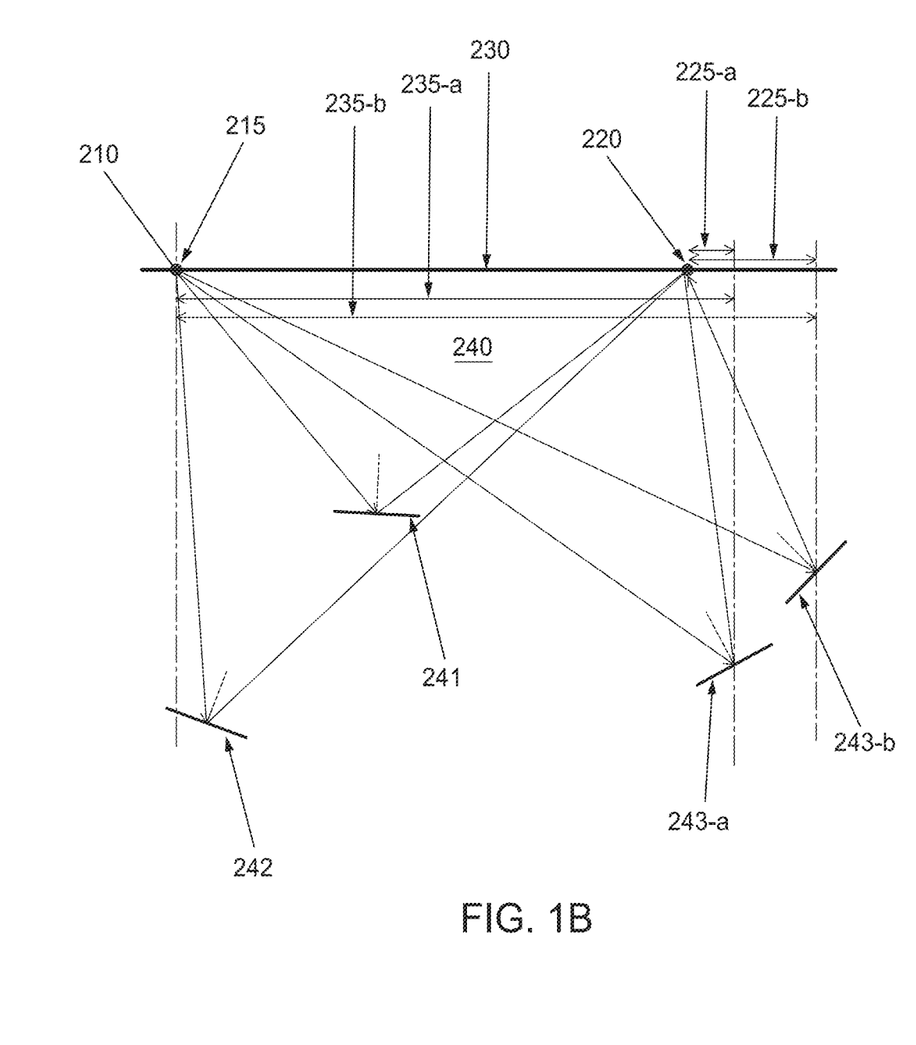

FIG. 1B illustrates another exemplary portion of a seismic survey. Elements of FIG. 1B are numbered similarly to like elements in FIG. 1A. For example, FIG. 1A includes reflectors 141, 142, 143, while FIG. 1B includes reflectors 241, 242, 243-a, and 243-b (likewise, FIG. 1A includes seismic source 110 and seismic receiver 120 at the surface 130 of a formation 140; and FIG. 1B similarly includes seismic source 210 and seismic receiver 220 at the surface 230 of a formation 240). In FIG. 1B, source padding 215 can be seen to be zero. FIG. 1B also illustrates two aperture selection options. Aperture 235-a includes reflectors 241, 242, and 243-a, while aperture 235-b includes reflectors 241, 242, 243-a, and 243-b. Aperture 235-a includes receiver padding 225-a, while aperture 235-b includes (larger) receiver padding 225-b.

Figure 2:
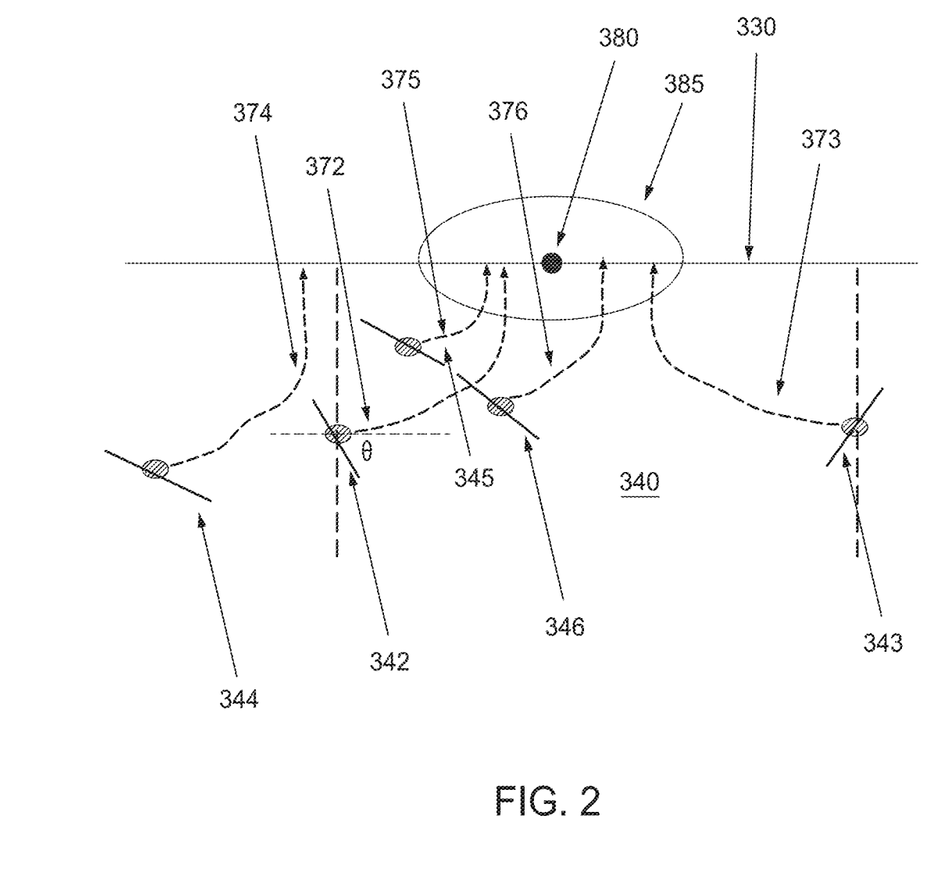
FIG. 2 illustrates a ray tracing of an exemplary portion of a seismic survey.

FIG. 2 illustrates a possible ray tracing of another exemplary portion of a seismic survey. FIG. 2 illustrates reflectors 342, 343, 344, 345, and 346 in subsurface formation 340. Each reflector 342-346 has a different dip angle. For example, reflector 342 has a dip angle marked with θ. Ray tracings 372-376 extend from each reflector 342-346. The ray tracings 372-376 represent the path seismic waves may take when traversing the subsurface formation 340 from each reflector 342-346. The curvature in each ray tracing 372-376 indicates how the seismic waves may change direction as the density and substance in the subsurface formation 340 varies. Typically, ray tracing techniques repeatedly advance idealized narrow rays by discrete amounts through a model of the subsurface formation. Although very simple hypotheticals can be analyzed by propagating a few rays using simple mathematics, detailed analysis of actual survey models will utilize a seismic data analysis system (e.g. a high-speed computer) to propagate many rays.

As an example, ray tracing 372 begins normal (perpendicular) to reflector 342. Computationally, the ray tracing 372 has origin coordinates at the launch point from the reflector 342. An initial geophysical model of subsurface formation 340 may be used to propagate the wavefront through the formation. For example, a coarse-grid velocity model may be used as the initial geophysical model. The ray tracing 372 may then reach the surface 330, at which point final arrival coordinates of ray tracing 372 may be determined.

FIG. 2 illustrates the use of bottom-up ray tracing for aperture estimation. Midpoint 380 is calculated as the source-receiver midpoint for this gather. Vicinity 385 is an area surrounding midpoint 380. For example, user input may determine the in-line and/or cross-line boundaries of vicinity 385. In some embodiments, vicinity 385 may be defined by a fixed number input from the user. In some embodiments, vicinity 385 may be defined by a fixed percent of the maximum offset. In some embodiments, vicinity 385 may be defined by a distance function from the midpoint 380. In some embodiments, vicinity 385 may be skewed with respect source location or receiver location. Vicinity 385 is illustrated as an elliptical area, but other contiguous shapes may be selected. In some embodiments, the shape of vicinity 385 may not be symmetrical on the source-side compared to the receiver-side. In some embodiments, the selected vicinity may be between about 50 m and about 100 m, though other vicinities are possible. As illustrated, bottom-up ray tracing from each of the reflectors 342-346 identifies which of ray tracings 372-376 arrive at the surface 330 in vicinity 385 surrounding midpoint 380.

Figure 3:
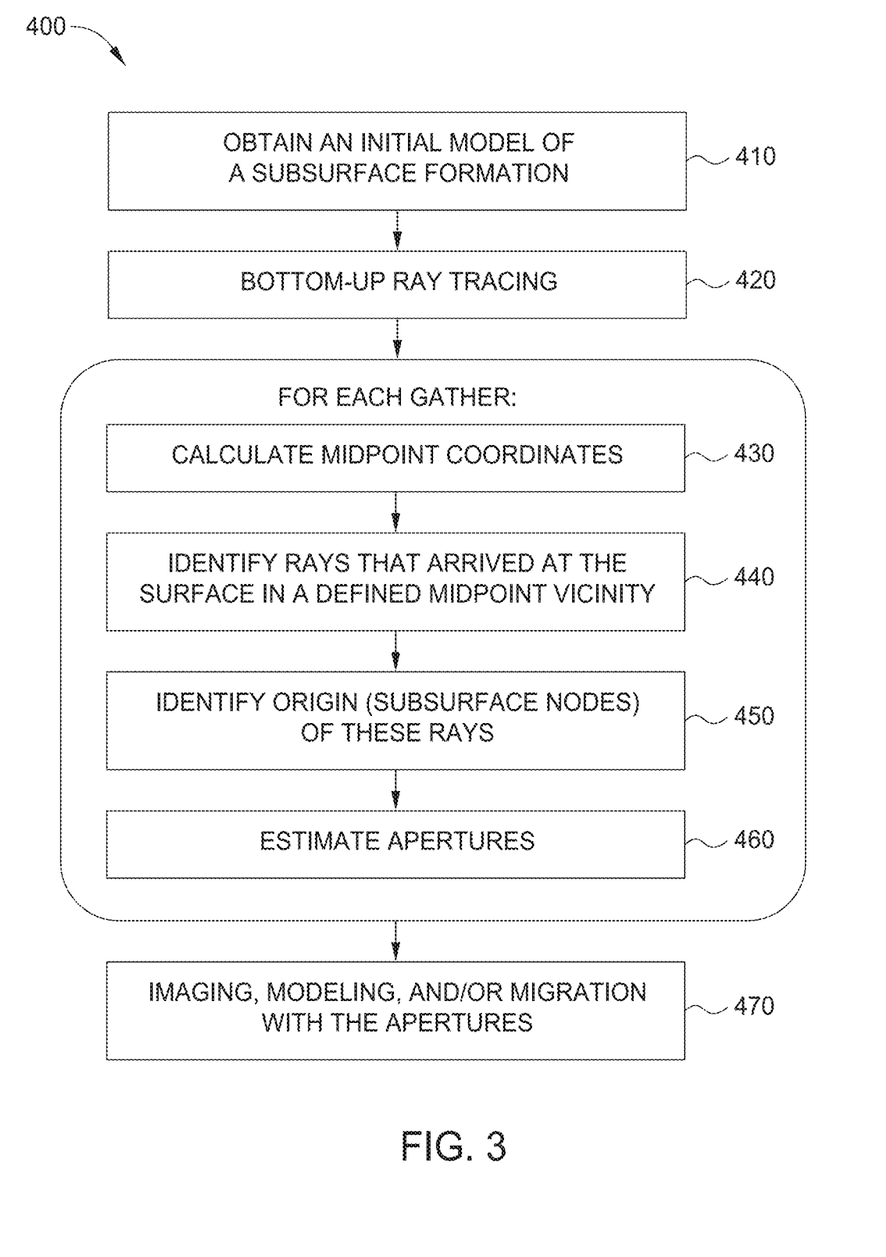
FIG. 3 illustrates a method according to embodiments of this disclosure.

FIG. 3 illustrates a method 400 that may automatically define a preferred and/or optimal aperture using dip and velocity model information for each gather in a survey. The method 400 may apply variable aperture estimations for the gradient/image computational step of an RTM/FWI workflow. The method 400 may produce results of per-shot and/or per-gather calculations that serve as input for RTM/FWI simulators.

The method 400 begins at block 410 by selecting a discreet subset of "chosen" points from an initial model of a subsurface formation. The initial model may be a starting subsurface physical properties model, as is typically used at the beginning of an FWI workflow. The initial model may be a coarse-grid velocity model. The selection of chosen points could be as simple as selecting equally-spaced points, or as refined as selecting a set of points chosen from horizons picked by an interpreter. The subset of subsurface grid points may include all of the grid nodes, a fraction of the grid nodes (e.g., with the fraction defined in each spatial dimension), and/or the subset may include points defined by user-specified bounding surfaces.

The method 400 continues at block 420 wherein each of the points in the subset is utilized for bottom-up ray tracing. Structural dip information from the initial model may be used to initialize the ray tracings. For example, the dip at each node may be used to determine origin coordinates and initial propagation direction for each ray. A central ray or a small cone of rays may be computationally propagated through the formation for each set of origin coordinates. In some embodiments, utilizing a small cone of rays improves stability of the computations. In some embodiments, initial orientation of the rays (ray cones) may be defined by the local dip and/or azimuth values (user provided constant or variable quantities). Either isotropic or anisotropic ray tracing techniques may be used.

The method 400 continues at block 430. Blocks 430-460 may be performed sequentially. Blocks 430-460 may be repeated for each gather in the survey. Blocks 430-460 for a first gather may be performed prior to or simultaneous with performance of blocks 430-460 for a second gather. At block 430, coordinates of a midpoint for the source-receiver pair of the gather is calculated. In some embodiments, aperture padding values may be estimated on a per-shot basis for each gather's midpoint location to clarify problem definition and/or to avoid complexity due to variable survey orientation. In some embodiments, gathers other than midpoint gathers may be used. Therefore, other locations (besides midpoint) of aperture estimations may be used.

At block 440, a user-defined or a pre-defined midpoint vicinity surrounds the calculated midpoint. The vicinity is used to identify rays from the bottom-up ray tracing (of block 420). Rays emitted from the set of subsurface nodes are traced until they reach the model's top surface (or leave the domain/violate other principles and boundary conditions). Rays that arrive at the surface within the vicinity are identified.

At block 450 the origin (coordinates of subsurface nodes) of the rays that arrived at the surface within the vicinity is identified. For example, a ray tracing may have surface arrival coordinates within the specified midpoint vicinity. The origin coordinates of that ray tracing may be obtained.

At block 460, an aperture is estimated that includes each of the identified subsurface nodes. The aperture may be defined by the source-receiver pair, the source padding, and the receiver padding. The results of the aperture estimations of block 460 may be stored in a table, identifying an aperture corresponding to each gather in the whole survey.

Blocks 430-460 may be repeated for each gather in the survey, and the results of the aperture calculations of block 460 may be stored in a common table. For example, the aperture table may include aperture values in both the cross-line and the in-line directions, calculated midpoint coordinates, and other information. In some embodiments, an aperture map may be generated. In some embodiments, smoothing techniques may be applied to the aperture table and/or aperture map. Smoothing techniques may be most beneficial for complex subsurface formations.

The method 400 continues at block 470, wherein the aperture table may be used to generate an image, perform modeling, and/or perform migration with the apertures serving as, for example, an input to RTM and/or FWI simulators. The modeling and/or migration may include inversion of the data, imaging of the data, survey design, performing wave equation techniques, simulations, and/or any other useful processing techniques. In some embodiments, the aperture table may be used with seismic data collected at multiple points in time. For example, two seismic surveys may be conducted for generally the same subsurface formation at different points in time to understand how the formation (and hydrocarbons therein) changes over time. In such embodiments, further computational efficiency may be achieved by utilizing the same aperture table with data sets from both seismic surveys.

Figure 4A:
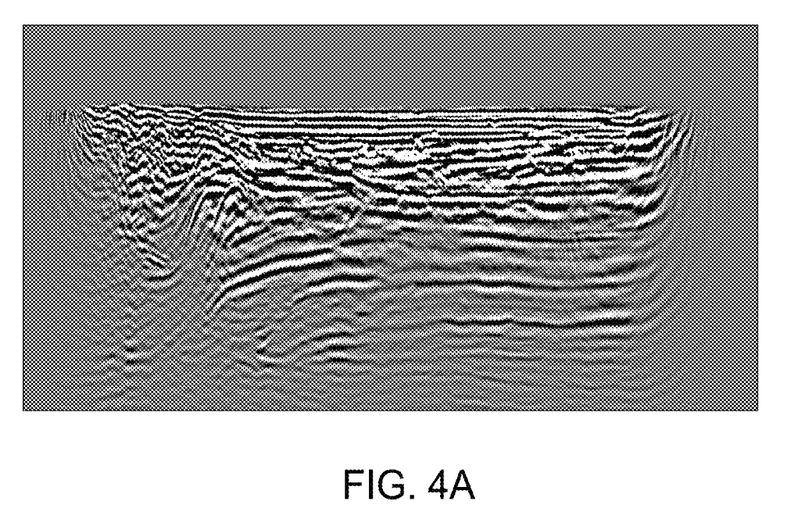
FIGS. 4A-4B illustrate exemplary imaging results of stacked preconditioned gradient imaging with constant aperture values in comparison to variable aperture estimations.
Figure 4B:
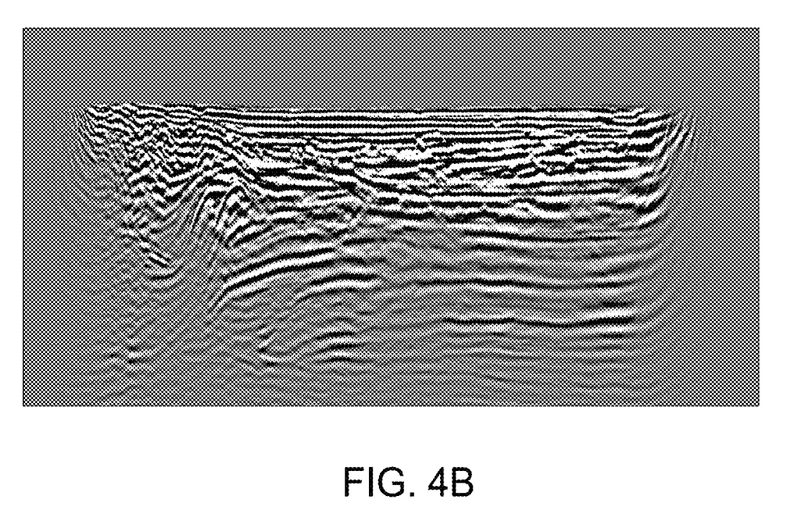

FIGS. 4A-B illustrate exemplary imaging results of stacked preconditioned gradient imaging with constant aperture values in comparison to variable aperture estimations. Notice that FIG. 4A, based on constant aperture values, shows approximately the same amount of numerical noise as FIG. 4B, based on variable aperture estimations. The imaging done with variable aperture estimations, however, resulted in significant computational savings.

Figure 5A:
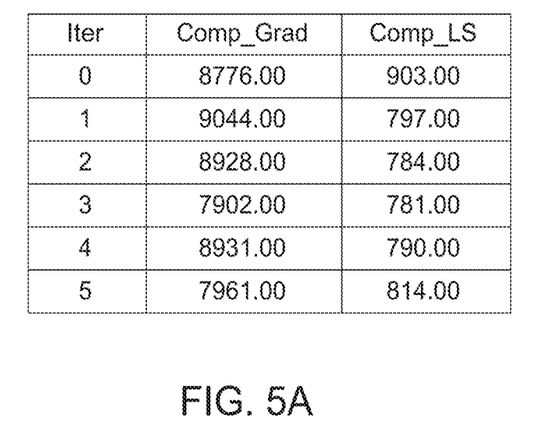
FIGS. 5A-5B illustrate exemplary computer performance results of inverting seismic data with constant aperture values in comparison to variable aperture estimations.
Figure 5B:
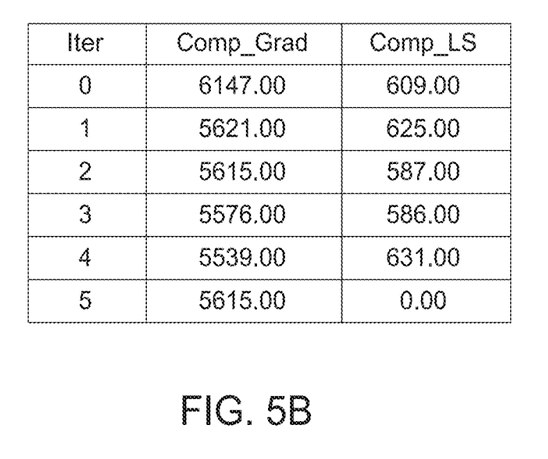

FIGS. 5A-B illustrate exemplary computational performance results of inverting seismic data with constant aperture values in comparison to variable aperture estimations in accordance with the present technological advancement. Notice that the time (sec.) for the compute gradient (Comp_Grad) and line search computation (Comp_LS) in FIG. 5A, based on constant aperture values, is consistently higher than that in FIG. 5B, based on variable aperture estimations. Overall, variable aperture estimations produces about 33% reduction in computer costs in this example.

In all practical applications, the present technological advancement must be used in conjunction with a seismic data analysis system (e.g., a high-speed computer), programmed in accordance with the disclosures herein. Preferably, in order to efficiently perform FWI, the seismic data analysis system is a high performance computer ("HPC"), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

Figure 6:
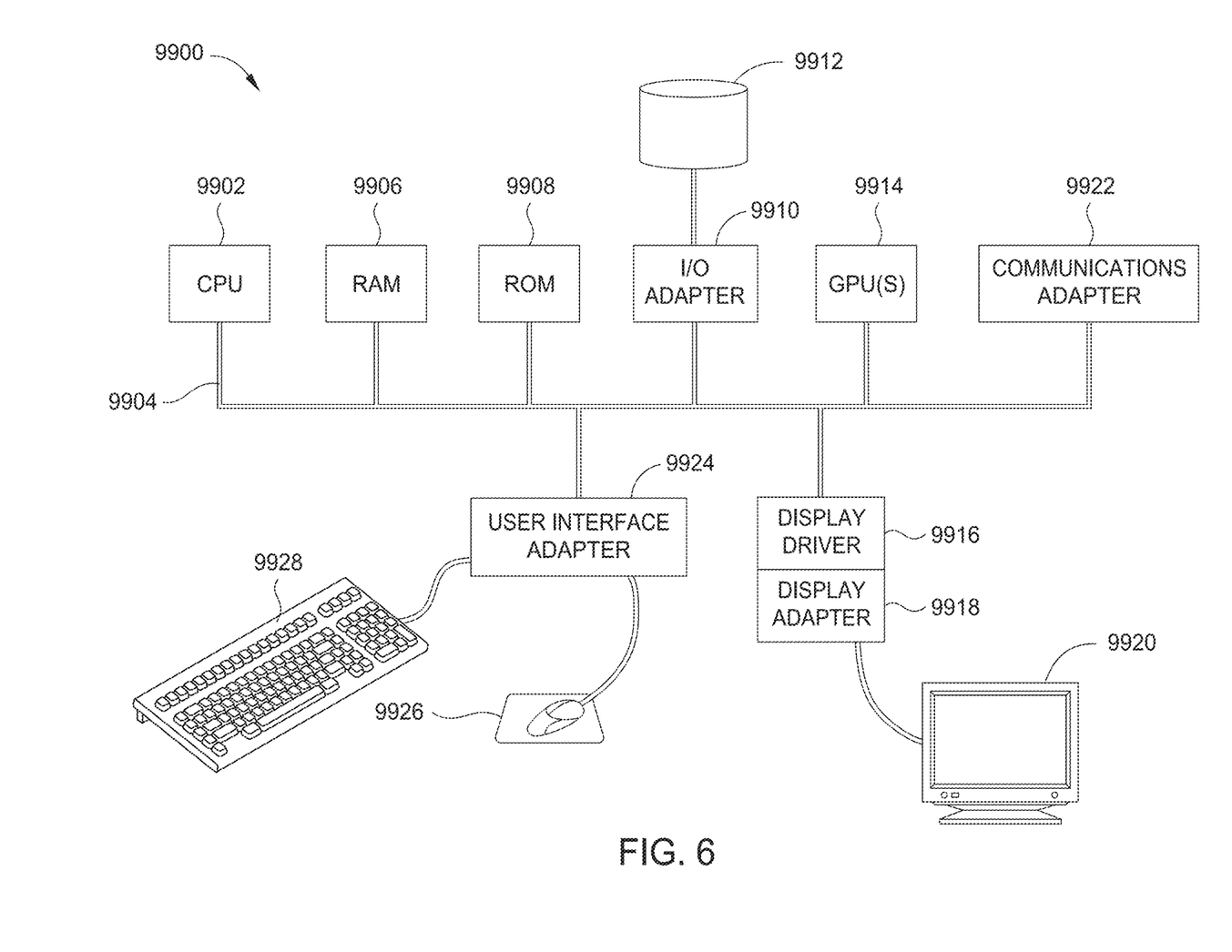
FIG. 6 illustrates a block diagram of a seismic data analysis system upon which the present technological advancement may be embodied.

FIG. 6 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 6, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory ("RAM") 9906, which may be SRAM, DRAM, SDRAM, or the like. The system 9900 may also include additional non-transitory, computer-readable media such as a read-only memory ("ROM") 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; it may potentially also include one or more graphics processor units (GPUs) 9914, and one or more display driver(s) 9916.

The I/O adapter 9910 may connect additional non-transitory, computer-readable media such as a storage device(s) 9912, including, for example, a hard drive, a compact disc ("CD") drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user regarding available plug-ins.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits ("ASICs") or very large scale integrated ("VLSI") circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method of imaging seismic data for a subsurface formation comprising:
    obtaining an initial model of the subsurface formation, wherein the initial model comprises:
        a plurality of nodes that form at least part of a grid;
        an initial dip value for the plurality of nodes; and
        a set of origin coordinates for each of the plurality of nodes;
    performing bottom-up ray tracing for each node in the initial model, resulting in a set of arrival coordinates for each node;
    identifying a plurality of gathers from the seismic data;
    for each gather from the seismic data:
        calculating a set of midpoint coordinates;
        defining a midpoint vicinity surrounding the set of midpoint coordinates;
        identifying nodes having arrival coordinates within the midpoint vicinity; and
        estimating a unique aperture for each of the plurality of gathers based on the respective origin coordinates;
    storing the estimated aperture for each gather in an aperture table; and
    generating a subsurface volume or image with subsurface reflectors determined with the estimated apertures of the respective gathers.

2. The method of claim 1, further comprising causing a well to be drilled at a location determined from the subsurface volume or image.

3. The method of claim 1, further comprising performing Full Wavefield Inversion with the aperture table to image the seismic data.

4. The method of claim 3, further comprising:
    obtaining additional seismic data for the subsurface formation, wherein the additional seismic data is acquired at a different point in time from the imaged seismic data;
    performing Full Wavefield Inversion with the aperture table to image the additional seismic data; and
    comparing the imaged seismic data with the imaged additional seismic data to identify changes in the subsurface formation over time.

5. The method of claim 1, further comprising generating an aperture padding map.

6. The method of claim 5, further comprising applying smoothing techniques to the aperture padding map.

7. The method of claim 1, wherein the plurality of nodes represent a subset of chosen points from the initial model.

8. The method of claim 7, wherein the subset of chosen points consists of equally-spaced points.

9. The method of claim 1, wherein the initial model is a coarse-grid velocity model.

10. The method of claim 1, wherein the plurality of gathers are common shot gathers.

11. The method of claim 1, further comprising identifying a hydrocarbon potential of the subsurface formation.

12. A non-transitory computer readable medium comprising executable instructions that when executed cause a processor to:
    obtain an initial model of a subsurface formation, wherein the initial model comprises:
        a plurality of nodes that form at least part of a grid;
        an initial dip value for the plurality of nodes; and
        a set of origin coordinates for each of the plurality of nodes;
    perform bottom-up ray tracing for each node in the initial model, resulting in a set of arrival coordinates for each node;
    identify a plurality of gathers from a seismic data set;
    for each gather from the seismic data set:
        calculate a set of midpoint coordinates;
        define a midpoint vicinity surrounding the set of midpoint coordinates;
        identify nodes having arrival coordinates within the midpoint vicinity; and
        estimate a unique aperture for each of the plurality of gathers based on the respective origin coordinates;
    store the estimated aperture for each gather in an aperture table; and
    generate a subsurface volume or image with subsurface reflectors determined with the estimated apertures of the respective gathers.

13. The non-transitory computer readable medium of claim 12, wherein the executable instructions further cause the processor to invert the seismic data set with the aperture table to produce a graphical representations of the seismic data set.

14. A seismic data analysis system comprising:
a processor; and
a display configured to display graphical representations of a seismic data set, wherein the seismic data analysis system is configured to:
obtain an initial model of a subsurface formation, wherein the initial model comprises:
 a plurality of nodes that form at least part of a grid;
 an initial dip value for the plurality of nodes; and
 a set of origin coordinates for each node;
perform bottom-up ray tracing for each node in the initial model, resulting in a set of arrival coordinates for each node;
identify a plurality of gathers from the seismic data set;
for each gather from the seismic data set:
 calculate a set of midpoint coordinates;
 define a midpoint vicinity surrounding the set of midpoint coordinates;
 identify nodes having arrival coordinates within the midpoint vicinity; and
 estimate a unique aperture for each of the plurality of gathers based on the respective origin coordinates;
store the estimated aperture for each gather in an aperture table; and
invert the seismic data set with the aperture table to produce a graphical representations of the seismic data set.

15. The seismic data analysis system of claim 14, wherein the seismic data analysis system is further configured to generate a subsurface volume or image with subsurface reflectors determined with the estimated apertures of the respective gathers.

* * * * *